United States Patent [19]

Langer

[11] 4,136,457

[45] Jan. 30, 1979

[54] PIN MICROMETER ADAPTER

[76] Inventor: Klaus Langer, 1750 Halford Ave., Apt. 106, Santa Clara, Calif. 95051

[21] Appl. No.: 885,542

[22] Filed: Mar. 13, 1978

[51] Int. Cl.² .............................................. G01B 3/18
[52] U.S. Cl. ..................................................... 33/167
[58] Field of Search ............. 33/164 R, 164 B, 164 C, 33/164 D, 165, 167, 166

[56] References Cited

U.S. PATENT DOCUMENTS

| | | | |
|---|---|---|---|
| 2,445,402 | 7/1948 | Malmberg | 33/167 |
| 2,541,821 | 2/1951 | Kneissler | 33/167 |
| 2,590,922 | 4/1952 | Blewett et al. | 33/167 |
| 3,023,510 | 3/1962 | D'Ambrose, Jr. | 33/167 |
| 3,123,917 | 3/1964 | Haluska | 33/167 |

FOREIGN PATENT DOCUMENTS 583385 12/1946 United Kingdom ...................... 33/167

Primary Examiner—Richard R. Stearns
Attorney, Agent, or Firm—Linval B. Castle

[57] ABSTRACT

An adapter for a pin-anvil micrometer, such as used to measure wall thicknesses of small tubing. The jaws of pin micrometers can normally hold a pin of 1/16" minimum diameter while flexing approximately 0.001" and can therefore be used to measure, for example, wall thicknesses of tubing having a 1/16" diameter bore. The range adapter is an anvil extender that snugly fits over the micrometer jaws and extends the effective jaw length to near the spindle center line. Anvil pins of approximately 0.015" may then be used without flexing and the micrometer can then accurately measure distances from 1/64" holes or slots.

5 Claims, 4 Drawing Figures

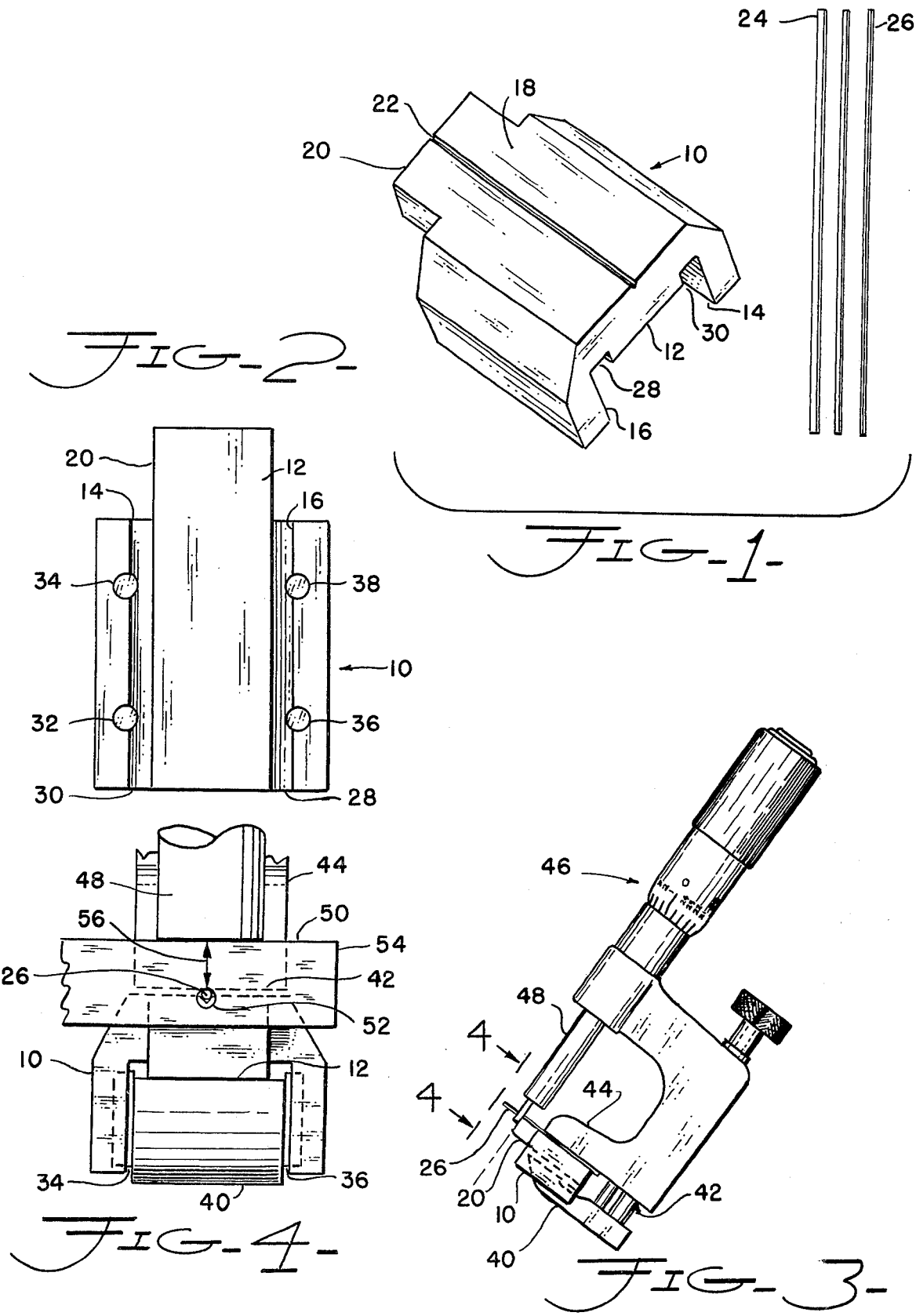

PIN MICROMETER ADAPTER

BRIEF DESCRIPTION OF THE INVENTION

This invention refers to measuring instruments, and particularly to an adapter for interchangeable anvil-type micrometers that permits measurements from holes or slots approximately one-quarter the size possible without the adapter.

Interchangeable anvil micrometers do not include fixed anvils but include jaws in which interchangeable anvils may be clamped normal to the axis of the micrometer spindle. While anvils of various shapes may be used, it is most common practice to clamp rods or pins so that measurements may be taken between the spindle face and the side surface of the rod or pin adjacent the spindle face. Such a micrometer is very useful for measuring hard-to-reach locations, and particularly valuable for measuring cylinder or tubing wall thicknesses, or the distance between a hole or slot to an edge.

Generally, the manufacturer of the interchangeable anvil-type micrometer provides a rod anvil having a diameter of approximately ⅛" which permits the micrometer user to make measurements from holes or slots that are ⅛" in diameter or larger. It is, of course, possible for the user to provide a smaller diameter rod or pin, and it has been found that the smallest practical pin is one with a diameter of 0.060". A steel pin of this diameter will flex approximately 0.0005" during a micrometer reading and it is therefore impractical to use smaller diameters even though the micrometer jaw may accept smaller sizes.

There is great need for a micrometer having a pinanvil smaller than 1/16". For example, in the inspection of machined parts, it may be necessary to accurately measure the location of a 0–80 tapped hole from the edge of the part. While such inspection must normally be made with an expensive optical comparator that is normally not available to a small machine shop, the measurement may be readily and accurately measured with a micrometer having a pin anvil with a diameter of 0.45" or smaller. Similarly, holes drilled in electronic printed circuit boards to accommodate integrated circuit chips and other components are generally a diameter of approximately 1/64" so that their location with respect to an edge or end of a board cannot be measured with a conventional pin anvil micrometer.

Briefly described, the present adapter is a micrometer jaw extension that snugly fits over the outer or movable jaw of an interchangeable anvil-type micrometer and extends from the jaw to approximately the center line of the micrometer spindle. Anvil pins as small as approximately 0.015" in diameter may be clamped between the adapter face and the micrometer inner jaw so that the micrometer may be used to accurately measure from slots or holes as small as 1/64".

DESCRIPTION OF THE DRAWINGS

In the drawings which illustrate a preferred embodiment of the invention:

FIG. 1 is a perspective drawing illustrating the adapter and pins which may be fitted in the longitudinal V-groove;

FIG. 2 is a plan view illustrating the internal details of the adapter;

FIG. 3 is an elevation view illustrating the adapter fitted for use on an interchangeable anvil micrometer; and FIG. 4 is an elevation view taken along the lines 4—4 of FIG. 3.

DETAILED DESCRIPTION

FIG. 1 is a perspective drawing illustrating the micrometer adapter and rods or pins that may be retained by the adapter. The adapter 10 is comprised of a rigid steel member having a generally U-shaped cross-section with an internal floor 12 and parallel walls 14 and 16 that are perpendicular to the floor 12. Opposite floor 12 is an exterior surface 18 that is flat, parallel with floor 12, and which may be longer than the side walls 14 and 16, as illustrated by the extension section 20. A V-groove 22 is cut along the center line of the exterior surface 18 so that when the adapter 10 is used on an interchangeable anvil micrometer, the groove 22 will rigidly clamp rods, such as the rod 24, or small pins, such as the pin 26. If desired, the corners between surface 18 and the exterior of side walls 14 and 16 may be chamfered as shown.

The spacing between the internal walls 14 and 16 of the adapter 10 will depend upon the width of the clamping jaw of the particular interchangeable anvil micrometer. Most micrometers of this type have a clamping jaw with the width of approximately 0.335". Accordingly, the width between the walls 14 and 16 should be approximately 0.350" so that the adapter 10 will loosely fit around the clamping jaw. The overall outside width of the adapter would therefore be approximately ½" and the overall length of the walls 14 and 16 should also be approximately ½", with the extension section 20 extending approximately ¼" further to make an overall length of the floor 12 and exterior surface 18 equal to approximately ¾". The V-groove 22 in the exterior surface 18 is preferably a 90° V and cut to a depth of approximately 0.01", and the thickness of the adapter between the floor 12 and exterior surface 18 may be approximately 0.175".

Some manufacturers produce a micrometer with a ¼" wide recess in the face of the clamping jaw for rigidly holding ¼" flat bar anvils. Therefore, channels 28 and 30 may be provided between the floor 12 and the interior side walls 14 and 16. The channels 28 and 30 may be approximately 0.1" in width so that the floor 12 has a net width of approximately ¼" to mate with bar anvil recesses in the clamping pins of some micrometers.

FIG. 2 is a plan view illustrating the interior section of the adapter 10 and shows the preferred means by which the adapter is fit to the clamping jaw of the micrometer. While it is possible to use a set screw to rigidly lock the adapter 10 to the clamping jaw, it is much more convenient and will not damage the surface of the clamping jaw if the adapter 10 resiliently adheres to the jaw. Accordingly, vertical holes are drilled in the internal portion of the jaws 14 and 16 and are fitted with resilient rods 32, 34, 36 and 38 which have a diameter of approximately 1/16", one-third of which extends into the channels 28 and 30 to grasp the side surfaces of the clamping jaw. The resilient rods are conveniently made from neoprene and may, if desired, be sections cut from a neoprene O-ring.

FIG. 3 is an elevation view illustrating the adapter 10 clamped between the clamping jaw 40 and the reference surface 42 of the stationary jaw 44 in an interchangeable anvil micrometer 46. The adapter 10 is preferably mounted so that the end of the extension section 20 is approximately aligned with the center line of the micrometer spindle 48. In this position, a pin 26 clamped in the V-groove of the adapter 10 is supported so that, during measurements, a shearing force is exerted against the pin 26 instead of a bending force that will flex the pin and cause erroneous readings.

FIG. 4 is an enlarged view taken along the lines 4—4 of FIG. 3 and illustrates the measurement between the edge 50 and a very small hole 52 in a strip of material 54. As illustrated in FIG. 4, the adapter 10 is clamped between the clamping jaw 40 and the stationary jaw 44 of an interchangeable anvil micrometer. A pin 26 in the V-groove in the top exterior surface of the adapter extends through the hole 52 in the material and the face of spindle 48 is brought in contact with the edge 50 to provide the measurement 56 indicated by the arrows.

Having thus described my invention, what is claimed is:

1. An adapter for converting an interchangeable anvil micrometer to accept very small diameter anvil pins, said adapter comprising:
   a rigid channelled member having a flat internal floor, a flat exterior surface parallel with said floor, and two substantially parallel side walls extending from said floor to provide a generally U-shaped cross-section;
   said internal floor having a width to provide a loose fit over the clamping jaw of the interchangeable anvil micrometer;
   said exterior surface having a length suitable for reaching the longitudinal center line of the micrometer spindle;
   a V-groove in the longitudinal center of said exterior surface for clamping a pin between said exterior surface and the stationary reference jaw of said micrometer; and
   means in at least one side wall of said channel member for retaining said member in said micrometer clamping jaw.

2. The adapter claimed in claim 1 wherein said means includes resilient means in each of said parallel side walls.

3. The adapter claimed in claim 2 wherein said resilient means comprise resilient rods mounted parallel with said walls and perpendicular to said floor, at least a portion of said rods extending from said walls into the channel section of said adapter.

4. The adapter claimed in claim 3 wherein said resilient rods are neoprene.

5. The adapter claimed in claim 3 wherein the floor and extension surface of said adapter are longer than said walls to provide an extension section to said adapter.

* * * * *